(12) United States Patent
Wakefield et al.

(10) Patent No.: US 6,732,098 B1
(45) Date of Patent: May 4, 2004

(54) RELATIONAL TEXT INDEX CREATION AND SEARCHING

(75) Inventors: Todd D. Wakefield, Park City, UT (US); David L. Bean, West Bountiful, UT (US); Jeffrey A. Lorenzen, Park City, UT (US)

(73) Assignee: Attensity Corporation, Salt Lake City, UT (US)

( * ) Notice: Subject to any disclaimer, the term of this patent is extended or adjusted under 35 U.S.C. 154(b) by 0 days.

(21) Appl. No.: 09/927,770

(22) Filed: Aug. 10, 2001

Related U.S. Application Data

(60) Provisional application No. 60/224,594, filed on Aug. 11, 2000, and provisional application No. 60/224,334, filed on Aug. 11, 2000.

(51) Int. Cl.[7] .............................................. G06F 17/30
(52) U.S. Cl. .............................................. 707/5; 707/4
(58) Field of Search ............................ 707/1, 10, 101; 704/1, 8, 4, 9, 10; 345/708, 853; 700/104, 90; 341/51; 706/11; 703/6, 2

(56) References Cited

U.S. PATENT DOCUMENTS

| | | | | |
|---|---|---|---|---|
| 4,965,763 | A | 10/1990 | Zamora | 704/1 |
| 4,992,972 | A | 2/1991 | Brooks et al. | 345/708 |
| 5,146,405 | A | 9/1992 | Church | 700/90 |
| 5,424,947 | A | 6/1995 | Nagao et al. | 704/10 |
| 5,475,587 | A | 12/1995 | Anick et al. | 704/4 |
| 5,614,899 | A | 3/1997 | Tokuda et al. | 341/513 |
| 5,696,916 | A | 12/1997 | Yamazaki et al. | 345/853 |
| 5,799,268 | A | 8/1998 | Boguraev | 704/10 |
| 5,802,504 | A | 9/1998 | Suda et al. | 706/11 |
| 5,844,798 | A | 12/1998 | Uramoto | 704/10 |
| 5,878,385 | A | 3/1999 | Bralich et al. | 704/10 |
| 5,890,103 | A | * 3/1999 | Carus | 704/8 |

(List continued on next page.)

FOREIGN PATENT DOCUMENTS

| | | | |
|---|---|---|---|
| WO | WO 98/24016 | 6/1998 | |
| WO | WO 99/18527 | 4/1999 | 364/488 |
| WO | WO 00/14651 | 3/2000 | 704/9 |
| WO | WO 00/46703 | 8/2000 | 703/2 |

OTHER PUBLICATIONS

David L. Bean; Ellen Riloff Corpus–Based Identification of Non–Anaphoric Noun Phrases.Proceedings□□of the Annual Meeting of the ACL, Morgan Kaufmann, 1999.*

Riloff, Ellen, "Automatically Constructing A Dictionary for Information Extraction Tasks", Proceedings of the Eleventh National Conference on Artificial Intelligence (1993), pp. 811–816.

Riloff, Ellen, "Automatically Generating Extraction Patterns from Untagged Text", Proceedings of the Thirteenth National Conference on Artificial Intelligence (1995), pp. 1044–1049.

Riloff, Ellen, "Using Learned Extraction Patterns for Text Classification", Connectionist, Statistical and Symbolic Approaches to Learning for Natural Language Processing (1996), pp. 275–289.

Riloff, Ellen, "Little Words Can Make a Big Difference for Text Classification", Proceedings of the 18th Annual International ACM SIGIR Conference on Research and Development in Information Retrieval, pp. 130–136.

Riloff, Ellen and Schmelzenbach, Mark, "An Empirical Approach to Conceptual Case Frame Acquisition", Proceedings of the Sixth Workshop on Very Large Corpora (1998), 8 pages.

*Primary Examiner*—Diane D. Mizrahi
*Assistant Examiner*—Yicun Wu
(74) *Attorney, Agent, or Firm*—Daniel P. McCarthy; Parsons Behle & Latimer

(57) ABSTRACT

In an environment where it is desire to perform information extraction over a large quantity of textual data, methods, tools and structures are provided for building a relational text index from the textual data and performing searches using the relational text index.

16 Claims, 14 Drawing Sh

Index Creation Algorithm, High Level

U.S. PATENT DOCUMENTS

| | | | |
|---|---|---|---|
| 5,901,068 A | 5/1999 | Batchilo et al. | 703/6 |
| 5,963,940 A * | 10/1999 | Liddy et al. | 704/9 |
| 6,056,428 A | 5/2000 | Devoino et al. | 703/2 |
| 6,102,969 A * | 8/2000 | Christianson et al. | 707/10 |
| 6,167,370 A | 12/2000 | Tsourikov et al. | 704/9 |
| 6,202,043 B1 | 3/2001 | Devoino et al. | 700/104 |
| 6,304,870 B1 * | 10/2001 | Kushmerick et al. | 707/10 |
| 6,405,162 B1 * | 6/2002 | Segond et al. | 704/9 |

* cited by examinereets

A Sample Information Retrieval Index

Document A : Now is the time.
Document B : For all good men.
Document C: To come to the aid of their country.

|         | Document A | Document B | Document C |
|---------|------------|------------|------------|
| Now     | 1          |            |            |
| Is      | 1          |            |            |
| The     | 1          |            | 1          |
| Time    | 1          |            |            |
| For     |            | 1          |            |
| All     |            | 1          |            |
| Good    |            | 1          |            |
| Men     |            | 1          |            |
| To      |            |            | 2          |
| Come    |            |            | 1          |
| Aid     |            |            | 1          |
| of      |            |            | 1          |
| their   |            |            | 1          |
| country |            |            | 1          |

Figure 1

```
CLAUSE
    NP (SUBJ)
        The [article]
        Department of Justice [noun (phrasal, gov_entity)]
    VP (ACTIVE_VOICE)
        sued [verb, past tense]
    NP (DOBJ,)
        Microsoft [noun, (company)]
    PP
        for [preposition]
        NP
            antitrust [adjective]
            violations [noun]
    PP
        in
        NP
            federal [adjective]
            court [noun]
```

Figure 2a

A Graphical View of A Sentence Parse and Thematic Role Assignment

Index Creation Algorithm, High Level

Index Creation Algorithm, Low Level

Overall Flow

Flowchart – PowerDrill**

Overall Search Processing**

Figure 12

RELATIONAL TEXT INDEX CREATION AND SEARCHING

CROSS REFERENCE TO RELATED APPLICATIONS

Priority is hereby claimed under 35 U.S.C. §119(e) to the following U.S. Provisional Patent Applications: Ser. No. 60/224,594 filed on Aug. 11, 2000 and bearing the title "Method and System for Creating A Thematic Role Based Index for Information Retrieval Over Textual Data", and Ser. No. 60/224,334 filed on Aug. 11, 2000 and bearing the title "Method and System for Searching A Thematic Role Based Index for Information Retrieval Over Textual Data".

BACKGROUND OF THE INVENTION

The inventions herein relate to systems and methods for desired information located within one or more text documents. More particularly, the inventions relate to systems and methods which permit rapid, resource-efficient searches of natural language documents in order to locate pertinent documents and passages based on the role(s) of the user's search term.

In order to facilitate discussion of the prior art and the inventions with precision, the terms below are defined for the reader's convenience.

Glossary

Information Retrieval (IR)—The task of searching for textual information that matches a user's query from a set of documents.

Information Extraction (IE)—The task of identifying very specific elements, defined by a user, in a text. Often, this is the process of answering the questions who, what, where, when, how, and why. For example, a user might be interested in extracting the names of companies that produce software and the names of those software packages. Information Extraction is distinct from Information Retrieval because 1) IE looks for specific information within a document rather than returning an entire document, and 2) an IE system is preprogrammed for these specifications while an IR system must be general enough to respond to any user query.

Relevance—A document is relevant if it matches the user's query.

Recall—A measure of performance. Given the total number of documents relevant to a user's query, recall is the percentage of that number that the system returned as relevant. For example, if there are 500 documents that match a user's query, but the IR system only returns 50 relevant documents, then the system has demonstrated 10% recall.

Precision—A measure of performance. Given the total number of documents truly relevant to a user's query, precision is the percentage of the returned documents that were truly relevant. For example, if the IR system returned 50 documents, but only 25 of them matched the query, the system has demonstrated 50% precision.

Syntactic Roles—The subject, direct object, and indirect object of a clause. Although not strictly a syntactic role, we also include the type of verb phrase (active-voice, passive-voiced, middle-voiced, infinitive) in this group.

Conceptual Roles—Conceptual roles are a way of identifying the particular players within an action or event without regard to the syntax of the clause in which the action or event occurs. Consider the following two sentences.

1. The boy purchased an ice cream cone.
2. An ice cream cone was purchased by the boy.

In the first sentence, the subject is the purchaser and the direct object is the item that was purchased. In the second sentence, however, the subject is now the thing that was purchased and the purchaser is the object of the prepositional phrase introduced by "by." The "purchaser" and "purchased object" represent conceptual roles because they correspond to specific participants in a purchasing event. As evidenced by these two sentences, conceptual roles can appear in different locations within a sentence's syntactic structure. The advantage of using conceptual roles for information extraction over syntactic roles is that a system can extract the participants of an event regardless of the particular syntax of the sentence.

Theta Roles—Theta roles (also called thematic roles) are similar to conceptual roles in that they correspond to the participants of events or actions. In contrast to conceptual roles, the set of theta roles as defined herein is relatively constrained to include actors (who perform actions), objects or recipients (who receive action), experiencers (actors which play a role but receive no action directly), instruments (used to perform an action), dates (when an action occurred) and locations (where an action occurred). The set of conceptual roles, however, is not constrained. Conceptual roles can be defined to be appropriate to a particular task or collection of texts. In terrorism texts, for example, we may want to define the conceptual roles of perpetrator and victim, while in corporate acquisition texts we may want to define the conceptual roles of purchaser, purchasee, and transaction amount.

Syntactic Caseframe—An extraction pattern based purely on syntactic roles, e.g. "SUBJ <active-voice:kidnap>" would extract the subject of any active-voice construction of the verb "to kidnap."

Caseframe—synonymous with syntactic caseframe.

Theta Caseframe—A caseframe based on theta roles (often called conceptual roles) rather than syntactic roles, e.g. "AGENT <verb:purchase>" or "OBJECT <verb:purchase>."

Morphological Root Form—The original form of a word once suffixes and prefixes have been removed, e.g. verb conjugations reduced to the raw verb form: "reported" and "reporting" are both forms of "report."

Associative Model—The traditional approach to recognizing meaning in text. This model recognizes that certain words in association with each other generate meaning. For example, the terms "headquarters," "smoke," "alarm" and "siren" appear to generate the concept of a headquarters building on fire even though the term "fire" does not occur. Compare this approach to the Relational Model below.

Relational Model—An approach to recognizing meaning in text that takes advantage of the relationships between words. For example, the following three phrases each generate a different meaning: "headquarters on fire," "headquarters under fire" and "fire headquarters." The key to recognizing the distinction among these phrases is to recognize the relationship between "headquarters" and "fire."

Relational Text Index (RTI)—The final output which may be generated when using the invention. This is an index of events, relationships, the participants in those events or relationships, along with which document and sentence they occurred in.

Meta-type: A way of collecting specific conceptual types into a more general type. For example, if a verb normally represents a particular action, then a meta-type can be a group of verbs that could be considered synonymous. For example, the verbs "to think," "to believe," "to understand" could be considered to be somewhat synonymous, and as verbs of cognition, they give rise to the meta-type "Cognitive-action." Meta-types do not necessarily imply a two-level classification scheme. More than one meta-type may be combined into a single, more general meta-type. The meta-type, "movement-action" contains the meta-types "transportation-action" and "physical-movement-action" in which the former includes "to fly" and "to drive" while the latter includes "to walk," "to run" and "to crawl." Meta-types, therefore, represent nodes in a hierarchy of semantically related words in which each meta-type node must have at least two children. Note that common examples of non verb-based meta-types include grouping semantically related nouns or noun phrases together to include collections of dates, times, and locations.

Morphological Root Form—The original form of a word once suffixes and prefixes have been removed, e.g. verb conjugations reduced to the raw verb form: "reported" and "reporting" are both forms of "report."

POWERDRILL—A particular system that implements some of the inventions herein for information retrieval.

With the terms defined in the glossary above in mind, a discussion of the typical prior art keyword-based information retrieval systems and their weaknesses will be more meaningful.

Discussion of Prior Art

Traditional methods for information retrieval are based on an associative model of recognizing meaning in text. Associative models identify concepts by measuring how often particular terms occur in a specific document compared to how often they occur in general. In practice, this typically means means that such systems record the content of a document by recognizing which words appear within the document along with their frequency. Essentially, a standard information retrieval system will count how often each English word occurs in a particular document. This information is then saved in a matrix, or table, indexed by the word and document name. Such a table is depicted in FIG. 1 for the search term "Now is the time for all good men to come to the air of their country."

In a typical keyword-based information retrieval system, the table of FIG. 1 would contain a column for each document in the searchable database, and a row for every English word. Since the number of English words can be enormous, many information retrieval systems reduce the number of distinct words they recognize by removing common prefixes and suffixes from words. For example, the words "engine," "engineer," "reengineer" and "engineering" may be stemmed as instances of "engine" to save space. In addition, many information retrieval systems ignore commonly occurring words like "the" "an" "is" and "of." Because these words appear so often in English, they are assumed to carry little distinguishing value for the IR task, and eliminating them from the index reduces the size of that index. Such words are referred to as stop words.

When an IR user enters a query, the system looks up each query word in the table and records which documents contained the query word. Normally, each document is assigned a statistical measure of relevance, based on the frequency of the query word occurrence, which assists the system in ranking the returned documents. For example, if Document X contained a particular search term 10 times, and Document Y contained the same term 100 times, Document Y would be considered more relevant to the search query than Document X. In practice, IR systems can implement very complex statistical models that take into account more than one search term, the length of each document, the relative frequency of words in general text, and other features in order to return more precise measures of relevance to the user.

Keyword-based information retrieval is often imprecise because its underlying assumption is often invalid—that a document's content is represented by the frequency of word occurrences within the document. Two of the main problems with this assumption are that 1) words can have multiple meanings (polysemy), and 2) words in isolation often do not capture much meaning.

To illustrate polysemy, consider the word "stock." In Wall Street Journal texts, this word is most often used as a noun, meaning a share of ownership in a company. In texts about ranching, however, the word refers to a collection of cattle. In texts about retail business, the word can be a verb, referring to the act of replenishing a shelf with goods. By searching on words alone, without regard to their meaning, a keyword-based IR system returns irrelevant documents to the user. Researchers refer to this type of inaccuracy as a lack of precision.

To illustrate the issue behind working with words in isolation, consider the following two sentences.

1. The elephant ran past me.
2. The elephant ran over me.

Note that the only difference between the two sentences is the change in the preposition from past to over. Clearly, however, the sentences connote two very different occurrences. Keyword-based IR systems are unable to recognize the distinction because they do not interpret the function of the prepositional phrases "past me" and "over me" (they modify the elephant's running). Additionally, prepositions are considered to be stop words by most IR systems, so sentence 1 and sentence 2 will be represented in the keyword index as if they were identical. This type of inaccuracy is another example of a lack of precision—the user will receive irrelevant documents in response to his/her query.

Another issue with keyword-based information retrieval is that a user must be sure to enter the appropriate keyword in his/her query, or the IR system may miss relevant documents. For example, a user searching for the word "airplane" may find that searching on the term "plane" or "Boeing 727" will retrieve documents that would not be found by using the term "airplane" alone. Although some IR systems now use thesauri to automatically expand a search by adding synonymous terms, it is unlikely that a thesaurus can provide all possible synonymous terms. This kind of inaccuracy is referred to as a lack of recall because the system has failed to recall (or find) all documents relevant to a query.

Thus, in the prior art there is a clear need for a rapid and efficient search mechanism that will permit searching of natural language documents using an approach that recognizes meaning based on the relationships that words play with each other.

SUMMARY OF INVENTIONS

It is an object of some embodiments of the invention to provide a computational mechanism for creating search tool that supports a model of information retrieval with greater recall and precision capabilities than a keyword model. Further objects, features and advantages of the invention will become apparent to the reader upon review of this specification, the appended claims, and the associated drawings.

BRIEF DESCRIPTION OF DRAWINGS

FIG. 1 depicts a sample information retrieval index created by a prior art keyword-based information retrieval system.

FIG. 2a depicts a structural representation of a parsed sentence.

FIGS. 8–13 depict screen shots for use of a search tool in one embodiment of the invention.

DETAILED DESCRIPTION

Figure 2B:
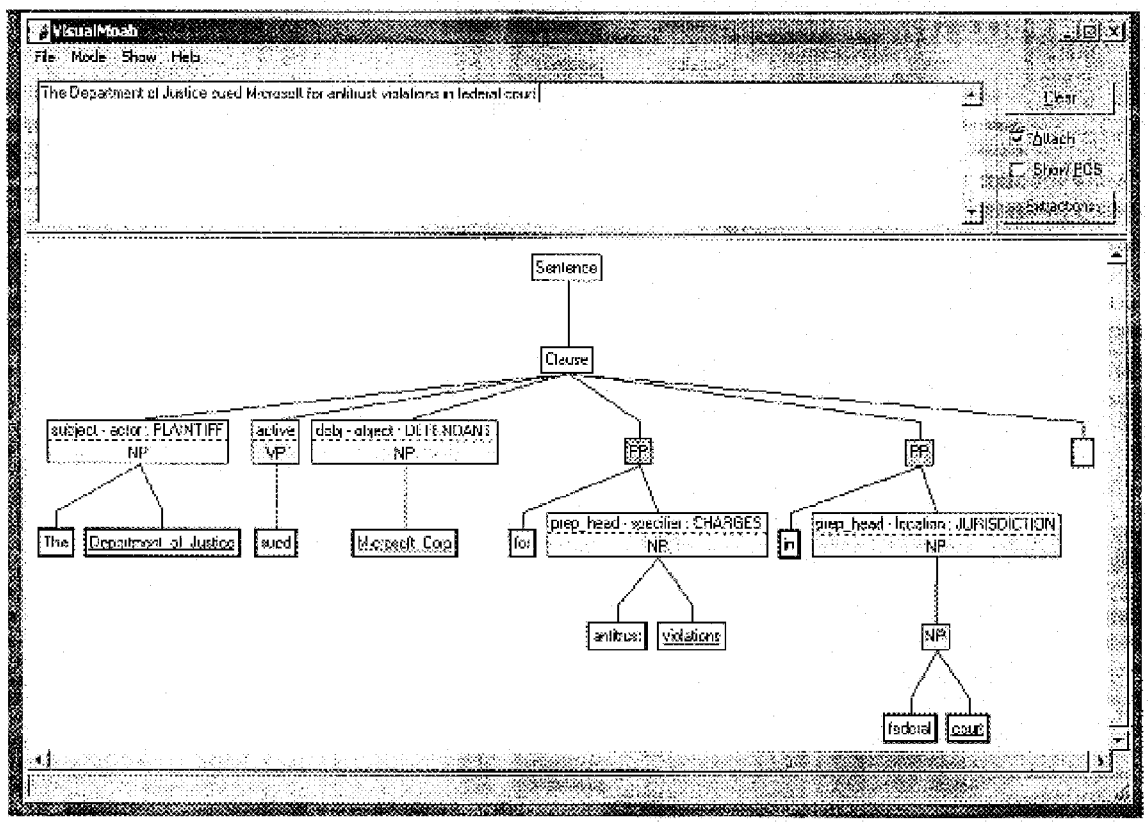
FIG. 2b depicts a graphical view of a sentence parse and thematic role assignment according to the invention.

The inventions disclosed herein utilize a method for performing information retrieval that is different and distinct from existing keyword-based methods. The inventions use algorithms, methods, techniques and tools designed for information extraction to create and search indexes that represent a significantly greater depth of natural language understanding than was applied in prior art search products.

There are four (4) important processes performed in some embodiments of the inventions: (a) parsing, (b) caseframe application, (c) theta role assignment and (d) unification. Parsing involves diagramming natural language sentences, in the same way that grade school students learn to do. Caseframe application involves applying structures called caseframes that perform the task of information extraction, i.e. they identify specific elements of a sentence that are of particular interest to a user. Theta role assignment translates the raw caseframe-extracted elements to specific thematic or conceptual roles. Unification collects related theta role assignments together to present a single, more complete representation of an event or relationship. The four processes are explained below.

Parsing

Parsing allows a computer to diagram text, identifying its grammatical parts and the roles of words within sentences. When parsing has been completed, each sentence in the document has been structured as a series of: Noun phrases (NPs), Verb phrases (VPs), Prepositional phrases (PPs), Adverbial phrases (ADVPs), Adjectival phrases (ADJPs), and Clauses.

As an example, consider the sentence "I bought a new printer from the office supply store." A parser might produce the following output:

Clause:
  NP (SUBJ)
    I [pronoun, singular]
  VP (ACTIVE_VOICE)
    bought [verb]
  NP (DOBJ)
    a [article]
    new [adjective]
    printer [noun]
  PP
    from (preposition)
  NP
    the (determiner)
    office (adjective)
    supply (adjective)
    store (noun)

This output shows the parts-of-speech for each word in the sentence, the phrase structure that encompasses the words, the voice of the verb (active vs. passive) and the syntactic role assignments of subject and direct object.

A wide range of parsers exist, with varying degrees of complexity and output information. Some parsers, for example, may not assign subject and direct object syntactic roles. Others may perform deeper syntactic analysis. For the purposes of the invention described in this document, the sentence parse above illustrates an appropriate level of detail required for proper functioning.

Caseframe Application

The next step is to review the grammatical structure of the sentence and apply caseframes. Caseframes are syntactic structures that recognize a local area of context. An example of a typical caseframe might be the following:

"<subj>active-voice:purchase"

Caseframes are based on the occurrence of two elements—a trigger term and a syntactic pattern. In this particular caseframe, the trigger term is any active-voice conjugation of the verb "purchase" and its syntactic pattern is the subject of this verb (recall that the subject of an active voice verb performs the action, e.g. "John-hit the ball," while the subject of a passive voice verb receives the action, e.g. "The ball was hit by John."). During processing, whenever the trigger term is found in a sentence, the system identifies the element indicated by the syntactic pattern and extracts it. In this case, the caseframe would extract the subject of any clause in which the verb phrase was a conjugated form of "to purchase." This caseframe will match any of the following phrases:

The boy purchased an ice cream cone.

Microsoft will purchase the startup company . . .

If the Mergers & Acquisitions Team would have purchased . . .

Intuitively, this caseframe gives a system the ability to identify the purchaser in a purchasing event.

Caseframes must either be hand-crafted or built with automated tool from a set of sample texts. Hand-crafting caseframes can be a tedious and time-consuming process, but it leads to a set of caseframes that are very specific for a given task. To create caseframes automatically, a system must start with raw caseframe patterns and then exhaustively create all possible caseframes that can be derived from those caseframe patterns. For example, the caseframe pattern "<subj>active-voice" would give rise to the caseframe "<subj>active-voice:purchase" when a sentence containing "to purchase" in the active voice was processed. The set of caseframe patterns is not defined by any standard.

In this invention, caseframes are created during the indexing process, i.e. as each sentence is parsed, the system generates the caseframes that are derived directly from the current sentence. In the three example sentences above, each would generate the caseframe "<subj>active-voice: purchase."

Theta Role Assignment

Once a sentence has been parsed, and caseframes have identified elements to be extracted, theta roles are assigned to those elements. Theta roles can be applied in two ways. Generic theta roles includes actions (what people and things do), actors (people and things that perform actions), objects (recipients of those actions), experiencers (people and things that participate in an action but neither perform nor directly receive the action), and specifiers (modifications that restrict the interpretation of an action or participant). Conceptual theta roles are defined according to a particular caseframe, and typically this is useful in a specific subject area. For example, where generic theta roles describe broadly applicable thematic roles, conceptual theta roles can describe the legal thematic roles of plaintiff, defendant, jurisdiction, charges, damages, etc.

Note that while generic theta role assignment requires no extra data for processing, performing subject-specific conceptual role assignment requires a file that maps syntactic caseframe extractions to specific conceptual roles based on the caseframe itself.

Unification

A sentence often generates more than one theta role extraction, and the process of unification reunites those extractions into a more formal, and more complete, representation of an event or relationship. In the sentence, "Microsoft will purchase the company during Q3 of 1999 . . . ," theta role assignment may identify multiple elements:

Action: purchase
Purchaser: Microsoft
Purchasee: the company
Time: Q3
Time: 1999

Unification reconciles the structure of the parsed sentence with the thematic roles that were extracted to create a single representation of the event:

Corporate acquisition event (purchase):
Purchaser: Microsoft
Purchasee: the company
Time: Q3 of 1999

In this example, the labeling of the combined event as a "corporate acquisition" is an optional element that makes for easier reading and some additional functionality in some embodiments of the inventions.

File and Sentence Information Gathering

Part of the Relational Text Index includes reference to where an extraction occurred, both in terms of document and sentence. This part of the process records a number of document-specific data elements, including the filename, the location, the revision date, the format (e.g. Word, Postscript, ascii), security access code, and source (e.g. Wall Street Journal or General Electric website). Each sentence is recorded by its beginning byte offset and ending byte offset within the document. This information allows downline systems to retrieve an individual sentence from the document.

Index Creation

The final step in the process is to produce a set of indices that correspond to the extracted elements and relationships identified during the prior steps. These indices are generated as text files that can be loaded into a database system for later querying. Collectively, the following six files represent one embodiment of the Relational Text Index:

1. File Information
    This file contains a unique key value, generated during this stage of processing, the filename of the original document, the full path to file, the location of the file, the revision date, the original file format, any security access codes associated with the file, and the source of the file.
2. Sentence Information
    This file contains a file key value (from FILEINFO), a sentence key value, generated during this stage of processing, and beginning and ending byte offsets.
3. Semantic Hierarchy Information
    If the parsing stage used a semantic hierarchy to add semantic features to an extraction, e.g. "Microsoft" may be recognized as a company name, these semantic features will be added to the Relational Text Index via two output files—the HIERACHY file and the CATEGORY file. The HIERACHY file records a term (e.g. "Microsoft"), its parent in the semantic hierarchy (e.g. "software_company"), and a flag indicating that this semantic feature is either a verb or a noun. This file, then, gives a later system the ability to file all terms known to be software companies. The CATEGORY file records the structure of the semantic hierarchy by relating a given semantic feature (e.g. "software_company") to its parent in the hierarchy (e.g. "general_company"). This allows a later system to reconstruct the semantic hierarchy.
4. Semantic Category Information
    See previous description.
5. Generic Thematic Role Information
    An AAO (actor action object) file contains an exhaustive record of the actors, actions, and objects extracted from each processed document. It contains a generated key value for the record itself and for each actor, action and object. It also contains a file ID that links back to the FILEINFO file, and a sentence ID that links back to the SENTINFO file. It records the byte offsets of each actor, action, and object. These byte offsets record both the full phrase and the head noun or verb of the extraction, e.g. if "the Seattle-based Microsoft" were extracted as an actor, beginning and ending byte offsets for both "the Seattle-based Microsoft" and "Microsoft" are recorded. Finally, the file contains both the head noun or verb and their morphological root forms, e.g. "buying" will be stored as the head verb, but "buy" will be stored as its root form.
6. Specifier Thematic Role Information
    This file records caseframes that represent modification to actors, actions, and objects. For example, in "President Reagan recently traveled to Japan . . . " there are three cases of modification: "President" modifies the extracted actor "Reagan," "recently" modifies the extracted action "traveled," and "to Japan" also modifies the extracted action "traveled." We refer to these modifications as specifiers, and they are recorded in the SPEC file with an AAO record ID that links back to a record in the AAO file, an AAO role ID that links to a specific actor, action, or object within the AAO record, a type that indicates if the specifier is a prepositional phrase or not, the preposition if applicable, and the byte offsets for the specifier itself. Occasionally, the parsing stage of this ihvention may assign a certainty value to the specifier extraction when the sentence that generates the extraction is ambiguous. This file contains that certainty value if it is produced by the parser. Finally, the morphological root form of the specifier is stored as well.

A collection of data elements which may be used for populating the indices is described in the algorithm section of this document.

An Example

Consider the following sentence:
    The Department of Justice sued Microsoft for antitrust violations in federal court.
    Step 1 (Parsing)
    Step 1 performs parsing, which creates the structural representation depicted in FIG. 2a. In this example, the parsing system has added additional information to some elements of the sentence, e.g. the fact that "Microsoft" is semantically a company. Such additional information can assist later stages of processing, particularly the thematic role assignment state.

For a graphical representation of this sentence parse, see FIG. 2b. In this figure, parsing, caseframe application, and thematic role assignment has been performed, indicating the participants in a litigation event, e.g. Microsoft is tagged as both an object (the generic conceptual role) and defendant (the subject-specific thematic role). FIG. 2b represents the processing of a sentence after Steps 1, 2, and 3.

Step 2 (Caseframe Application)

Once parsing is complete, the system applies caseframes to the parsed sentence to identify extracted elements in the sentence. The following caseframes extract the four noun phrases in the example sentence:

<subj>active_verb:sue->The Department of Justice
<dobj>active_verb:sue->Microsoft
<pp:for>active_verb:sue->antitrust violations
<pp:in>active verb:sue->federal court Step 3 (Theta Role Assignment)

Step 3 assigns theta roles to the noun phrases extracted in Step 2. Again, theta role assignment can operate in two modes. Using the default mode, the syntactic caseframes are translated into:

Action: sue

Actor of sue: The Department of Justice

Object of sue: Microsoft

Specifier of sue: (for) antitrust violations

Specifier of sue: (in) federal court

When assigning conceptual roles, the syntactic caseframes are translated into:

Action: sue

Plaintiff of sue: The Department of Justice

Defendant of sue: Microsoft

Charges of sue: (for) antitrust violations

Jurisdiction of sue: (in) federal court

Step 4 (Unification)

At this point, each extracted theta role is considered an individual element. In Step 4, unification collects these individual elements into a single event definition:

Litigation_event (sue): (based on default theta application mode)

Actor: The Department of Justice

Object: Microsoft

Specifier: (for) antitrust violations

Specifier: (in) federal court or

Litigation_event (sue): (based on optional domain-specific theta application mode)

Plaintiff: The Department of Justice

Defendant: Microsoft

Charges: (for) antitrust violations

Jurisdiction: (in) federal court

As a consequence of performing the foregoing steps, and RTI can be created as described below.

Relational Text Index Creation Algorithm

Figure 3:
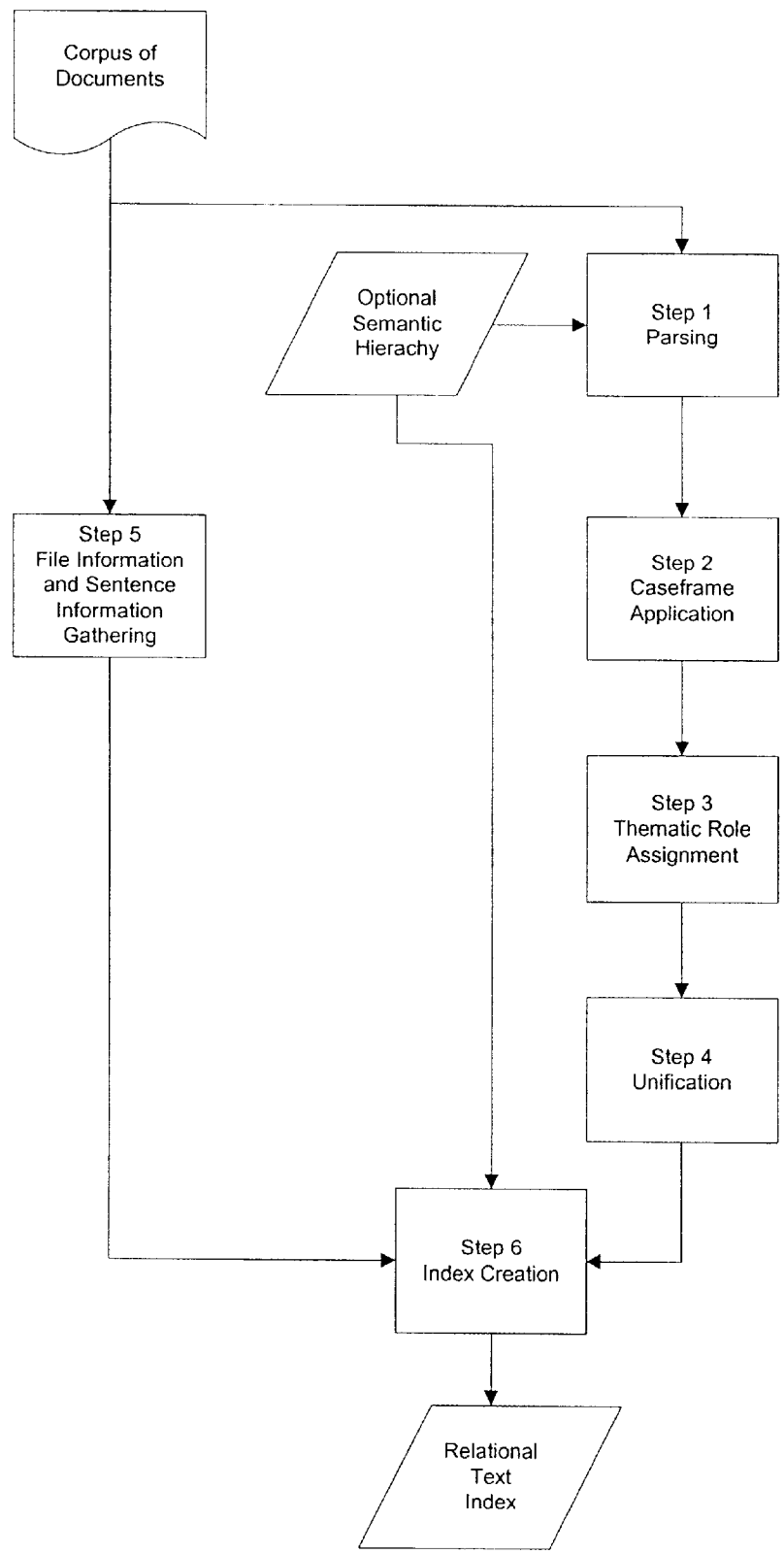
FIG. 3 depicts a high level flowchart of one embodiment of index creation in the invention.
Figure 4:
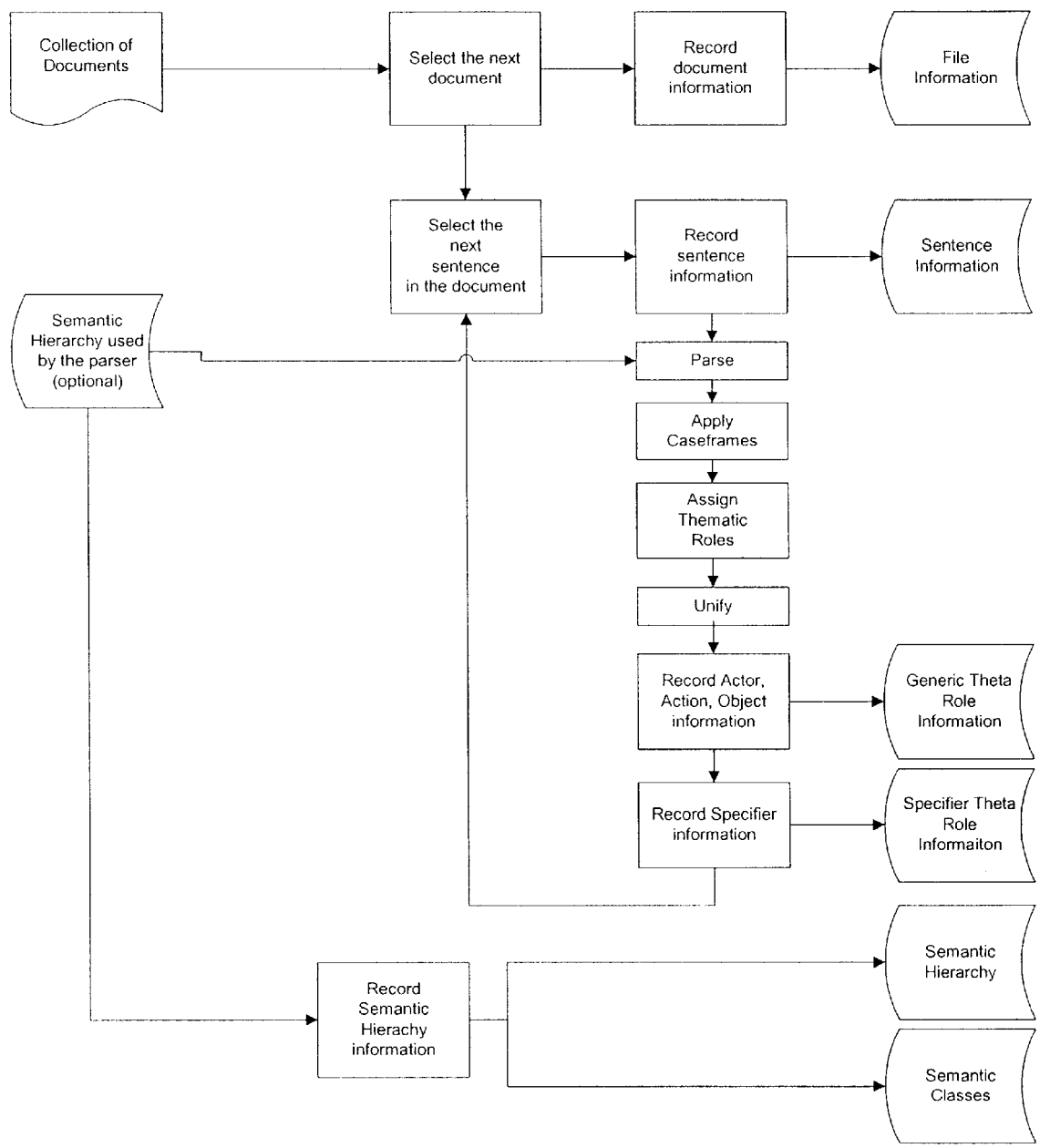
FIG. 4 depicts a low level flowchart of one embodiment of index creation in the invention.

The inventions use the tools of information extraction (parsing and caseframes) to build an index for information retrieval with a number of steps. One embodiment of the steps to be performed is shown below, but a myriad of variations and alternatives are possible. The inventors assume that the input to the system is a collection of texts, called a corpus, that represents the collection of documents over which users will execute information retrieval queries. As the following steps are read and considered, the reader should make reference to FIGS. 3 and 4 for graphical relationships of the steps being performed.

1. For each document to be indexed:
   a. (Steps 1 & 5) Parse each document. As each document is processed, record document-specific information including its name, its location, and its source. As each sentence is processed, record its location within the document.
   b. For each sentence in the document:
      i. (Step 2) Apply caseframes to identify events and the participants in those events in terms of syntactic roles.
      ii. (Step 3) Convert the extracted entities to generic theta roles rather than syntactic roles. See the algorithm for generic theta role assignment.
      iii. (Step 4) Unify individual extracted entities to a collective event definition.
      iv. (Step 6) Append to the Relational Text Index information gathered from the sentence. Specifically for each extracted actor, action or object role, the process records: the role's raw form and morphological root form, the document and sentence number in which it occurred, and the beginning and ending byte offsets for both raw form and the full phrase extraction. For each specifier role, the process records: the role's raw form, the document and sentence number in which it occurred, the preposition if applicable, a certainty value (some prepositional phrase modification is ambiguous), a link back to what extracted role this specifier modifies, and the beginning and ending byte offsets for the specifier, the full specifier phrase, and the preposition if applicable. As these records are added to the Relational Text Index, the process creates key values for each record to maintain links between the records. For example, in the sentence "The boy recently purchased an ice cream cone." the system would record the following:
         1. action (purchased, purchase, DOC_A, 17, 25, 17, 25)
         2. actor (boy, boy, DOC_A, 4, 6, 0, 6)
         3. object (cone, cone, DOC_A, 40, 43, 27, 43)
         4. specifier (recently, recently, DOC_A, 100%, 8, 15, link to action record)
      v. Return to item "b" until all sentences in the document have been processed.
   c. (Step 6) Append to the Relational Text Index information gathered from the document itself.
   d. Return to item "a" until all documents have been processed.
2. (Step 6) If the parser used a semantic hierarchy, output this hierarchy.
   a. Scan the hierarchy, creating a record for each node containing its name and the name of its parent in the hierarchical structure.
   b. Scan the parser's list of terms that fall into the semantic classes defined by the hierarchy, creating a record for each term containing its name and the name of its semantic class.

Implementation of this process results in automated creation of the RTI, which can then be used to quickly locate relevant portions of relevant documents without distracting the user with irrelevant documents.

General Thematic Role Assegnment Algorithm

General thematic role assignments, as described above, can be performed according to the following algorithm. This algorithm is provided by way of example and should not be considered limiting of the scope of the invention, since output of equal quality performed by another method can also be used by various embodiments of the invention.

For each verb phrase in a clause
  a. If the verb is in the active voice (John threw Jack the ball in the park.):
    i. Assign ACTION to the verb (throw)
    ii. Assign ACTOR to the subject (John)
    iii. Assign OBJECT to the direct object (the ball)
    iv. Assign RECIPIENT to the indirect object (Jack)
    v. Assign SPECIFIER to the prepositional phrases that modify the verb phrase (in the park)
  b. If the verb is in the passive voice (The ball was thrown by John to Jack in the park.):
    i. Assign ACTION to the verb (throw)
    ii. Assign OBJECT to the subject (The ball)
    iii. Assign ACTOR to the object of a "by" prepositional phrase (John)
    iv. Assign RECIPIENT to the indirect object (Jack)
    v. Assign SPECIFIER to the prepositional phrases that modify the verb phrase (in the park)
  c. If the verb is in the middle voice and has no direct object (The ship sank off the coast.):
    i. Assign ACTION to the verb (sink)
    ii. Assign EXPERIENCER to the subject (The ship)
    iii. Assign SPECIFIER to the prepositional phrases that modify the verb phrase (off the coast)
  d. If the verb is in the middle voice and has a direct object: (The ship sank the submarine off the coast.)
    i. Assign ACTION to the verb (sink)
    ii. Assign ACTOR to the subject. (The ship)
    iii. Assign EXPERIENCER to the direct object (the submarine)
    iv. Assign SPECIFIER to the prepositional phrases that modify the verb phrase (off the coast)
2. For each noun phrase in a clause (the rocky U.S. coastline in California)
  a. Assign SPECIFIER to the adjectives that modify the head noun (rocky)
  b. Assign SPECIFIER to the nouns that modify the head noun (U.S.)
  c. Assign SPECIFIER to the prepositional phrases that modify the noun phrase (in California)
3. For each nominalized verb pattern 1 in a clause (Rome's destruction of Athens)
  a. Assign ACTION to the nominalized verb (destroy)
  b. Assign ACTOR to the possessive noun (Rome)
  c. Assign OBJECT to the "of" preposition phrase (Athens)
4. For each nominalized verb pattern 2 in a clause (Athen's destruction by Rome)
  a. Assign ACTION to the nominalized verb (destroy)
  b. Assign OBJECT to the possessive noun (Athens)
  c. Assign ACTOR to the "by" preposition phrase (Rome)

File Structures for Index Creation.

Some embodiments of the inventions use unique file structures during index creation. In various implementations, files and file structures of any type desired can be used, but for the reader's interest and convenience, general information about file structures used in index creation is provided below.

Fileinfo:
  Fileid (key value created by the indexing process).
  Filename (name of the document, if available).
  Rawfile (full path to the document, if available).
  Location (location of the document, if available).
  Revdate (last date of modification).
  Type (document format, e.g. Word, Postscript, html, etc.).
  Access codes (for security access, if available).
  Source (origination of the document, e.g. "Wall Street Journal").
Sentinfo:
  Fileid (link back to FILEINFO table).
  Sentence number.
  Begin (a byte offset).
  End (a byte offset).
Hierarchy:
  Term (a term, e.g. "Microsoft").
  Parent (a category, e.g. "software companies").
  Type (noun or verb).
Category:
  Term (a category, e.g. "software companies").
  Parent (a supertype category, e.g. "general companies").
Aao:
  AAOid (key value created by the indexing process).
  ActorKey (morphological root form, e.g. "John").
  ActionKey (morphological root form, e.g. "threw").
  Objectkey (morphological root form, e.g. "ball").
  InfinitiveKey (morphological root form).
  Fileid (link back to FILEINFO table).
  Sentence number (link back to SENTINFO table).
  ActorOffset (location info).
  ActorLength (location info).
  ActionOffset (location info).
  ActionLength (location info).
  InfinitiveOffset (location info).
  InfinitiveLength (location info).
  ObjectOffset (location info).
  ObjectLength (location info).
  ActorNPOffset (location info).
  ActorNPLength (location info)
  ActionNPOffset (location info)
  ActionNPLength (location info)
  ObjectNPOffset (location info)
  Ob ectNPLength (location info).
  ActorActual (raw form of the extracted term, e.g. "John").
  ActionActual (raw form of the extracted term, e.g. "throw").
  ObjectActual (raw form of the extracted term, e.g. "ball").
Spec.
  AAOid (link back to a record in the AAO file).
  Role type (a flag for preposition or non-preposition).
  Certainty (a numeric value corresponding to a probability).
  AAO key (link back to a the actor, action, or object in an AAO record).
  Spec (morphological root form).
  Prep (the preposition if available).
  SpecActual (raw form).
  SpecOffset (location info).
  SpecLength (location info).
  PrepOffset (location info).
  PrepLength (location info).

Note that byte offsets can be represented either by the starting and ending offset, or the starting offset and a length—the functional difference is negligible.

Overall Processing Flow for Indes Creation

Figure 5:
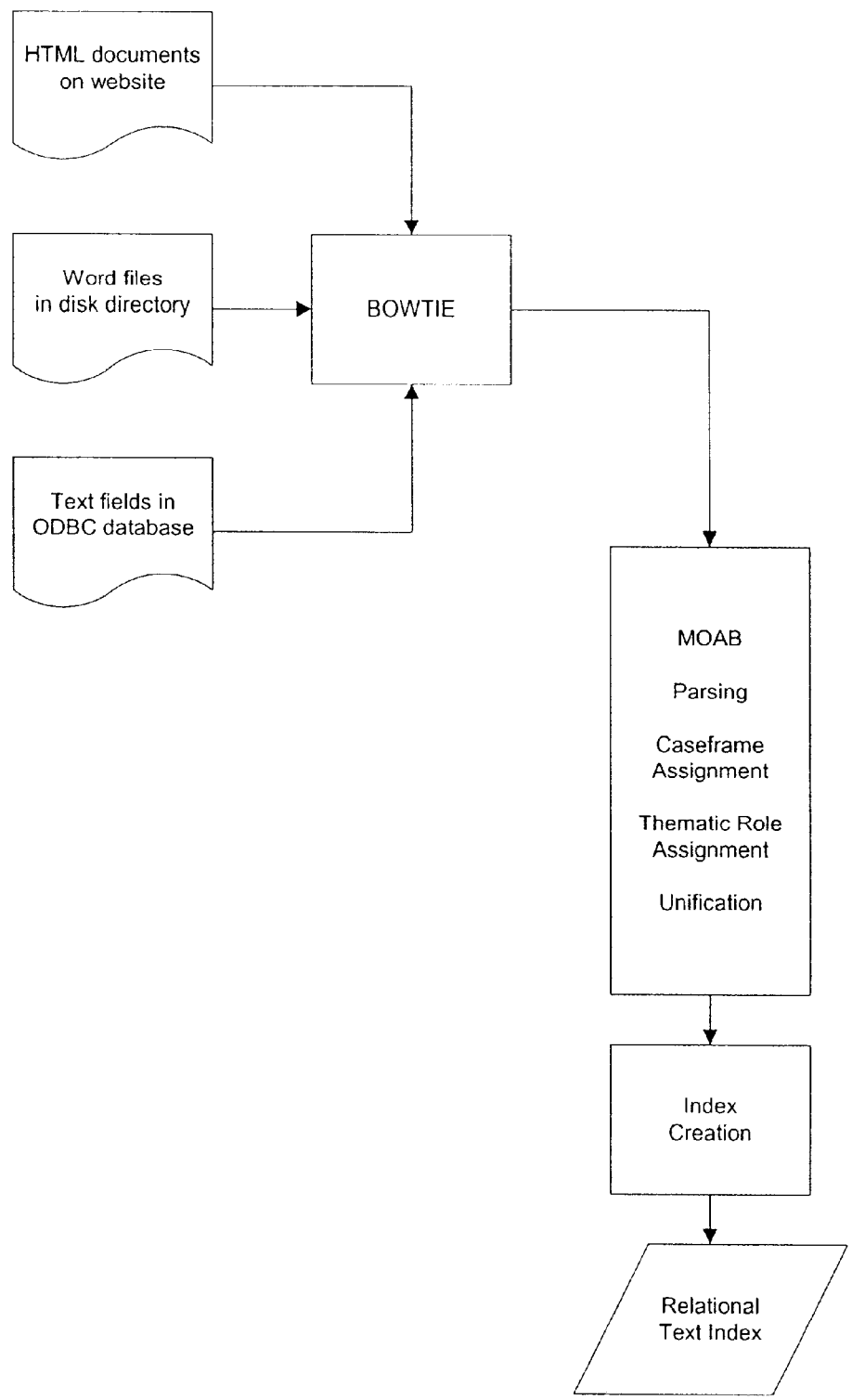
FIG. 5 depicts a flowchart indicating overall processing flow for index creation in one embodiment of the invention.

Referring to FIG. 5, overall processing flow of one embodiment of the inventions for RTI creation is depicted. First, documents can be collected from various sources such as websites, databases, storage media, or elsewhere. In one embodiment of the inventions, that collection process is performed by a collector program called BOWTIE, as described below. Following document collection, parsing, caseframe assignment, thematic role assignment, unification, and index creation occur to produce an RTI output. Parsing and caseframe assignment may be carried out by a program called MOAB, described below.

MOAB—This program is a parser that diagrams sentences and assigns syntactic roles to noun phrases in the parsed sentences. In addition, MOAB can operate in extraction mode. In this mode, the program takes as input a set of caseframes that it holds in memory. Given a sentence to parse, MOAB then parses the sentence and fires applicable caseframes on the sentence. Note that MOAB only indicates that an extraction has occurred by a particular caseframe. It does not record the location of the extraction. MOAB also creates caseframes from raw caseframe patterns when given a training corpus of texts. The MOAB parser is available from Attensity Corporation of Salt Lake City, Utah.

BOWTIE—This program acts as a collector for the indexing system. It performs three main tasks. First, it collects documents for indexing from various sources, e.g. web sites, hard disk directories, news feeds, database fields etc. Second, it converts documents from their original formats to simple ascii format, e.g. it converts Word, Postscript, Adobe Acrobat, etc. Third, it triggers the operation of the indexing system once its collected documents have been collected and converted. BOWTIE is available from Attensity Corporation of Salt Lake City, Utah.

Index Searching.

In the prior sections, there was discussion of document collection, parsing, caseframe assignment, thematic role assignment, unification, and creation of the Relational Text Index. Once the RTI has been created, the user may perform rapid and resourceefficient searches for documents that are relevant to his area of interest. Below, one embodiment of a way of searching the Relational Text Index is described. There are several main concepts behind this method of searching.

1. A Theta Role-Based Representation. In this model, rather than searching for the occurrence of a search term within a document's collection of words, the inventions offer the ability to search for that term when it is performing in a particular theta role. For example, a user can search for "Microsoft" only when Microsoft is the "actor," i.e. when it is performing some action. This is very different from searching for any occurrence of the word "Microsoft." (Consider "He walked across the Microsoft campus." vs. "Microsoft sued the U.S. Government." A standard keyword-based IR system would retrieve both sentences, but the theta role-based IR system would only retrieve the latter.) Currently, the invention focuses on the three theta roles of actor, action, and object. This focus is a result of the sparseness of data provided by the parser. Parsers that generate deeper conceptual representations of sentences support a wider range of theta roles.

2. Combined Theta Role Constraining. Once the user selects a search term for a theta role, e.g. the actor, action, or object roles, the system returns a list of documents in which the search term plays that particular role. In addition, the system displays a list of what other theta roles are found in the same documents in events or relationships associated with the original search term. For example, searching for "Microsoft" as an actor performs two tasks. First, it returns a list of documents in which "Microsoft" performed as an actor. Second, it returns a list of actions that Microsoft performed. The user can then narrow the query to select only those documents in which Microsoft performed some particular action, like "to sue." Thus the two theta role values have constrained the search. (The exact relationship among theta roles and how they constrain each other is defined further below).

3. Specifiers. In this model, any theta role can be specified by certain linguistic constructions. An action, for example, can be specified by adverbs or prepositional phrases, e.g. "He ran quickly." and "He walked to the store." The semantic content of a phrase can be dramatically changed by such modification, e.g. "He will cash the check." vs. "He will not cash the check." and "The software always crashes at startup." vs. "The software occasionally crashes at startup." This model allows the user to enter specifiers that restrict the retrieved documents to very precise language based on the use of adjectives, noun modifiers, adverbs, prepositional phrases, and infinitive verbs (e.g. "tried to run" and "failed to run").

4. Meta-types. In large corpora, searching on a particular actor, for instance, can yield an extremely large number of associated actions. For example, searching on "Microsoft" as an actor will produce a list of every action the company performed in the corpus. The inventions herein manage such large lists of theta-role values with metatypes. meta-type is a way to condense multiple theta-role values into a single, more general value. Verbs of communication, for example, to speak, to say, to talk, to mention, can be rolled into a single COMMUNICATE meta-type. A meta-type can be built for any theta role, not just verb-based action roles. A meta-type can contain other meta-types as well, thus leading to a hierarchical mechanism for maintaining semantic relationships. The user of the invention has the option of either selecting a meta-type as a search term, in which case all the theta-role values contained in that meta-type are used for searching, or drilling down into the meta-type to select a particular sub-meta-type or specific theta role value as a search term.

5. Collapsing on root form. The Relational Text Index includes not just the extracted thematic roles, but also their associated morphological root forms. This allows one to search for particular roles without having to enumerate the possible variations due to conjugation, singular vs. plural use, etc. For example, the action "sue" may occur as "sued" or "sueing" and the object "reporter" may occur as "reporter." This feature also allows a user to find search terms they may not initially think of using. When searching on "airlines" for example, a search tool user can expand the located thematic role extractions to find "American Airlines," "SkyWest Airlines," "Delta Airlines," etc.

Relational Text Index Searching Algorithm.

Figure 6:
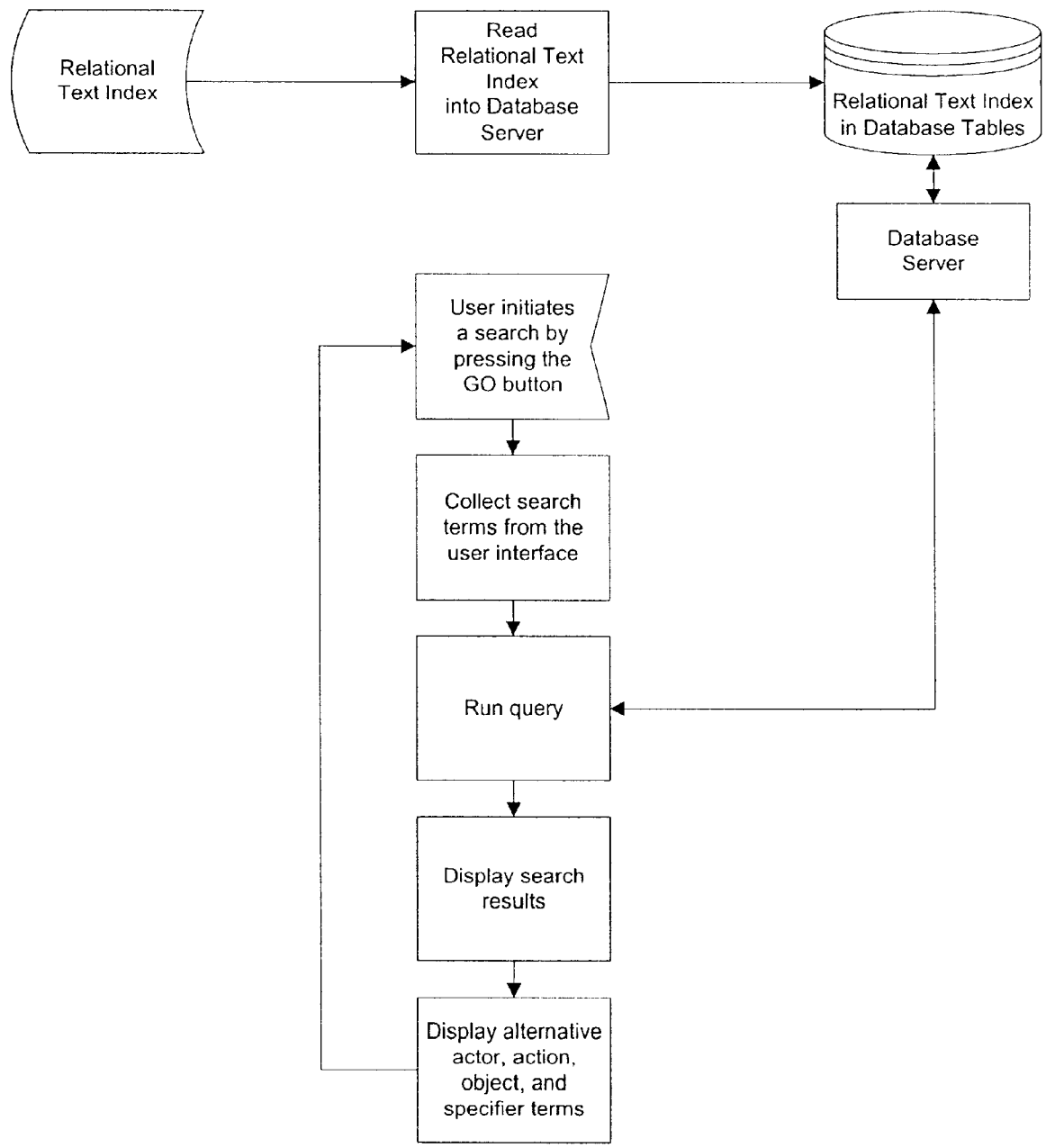
FIG. 6 depicts a flowchart indicating search processing in one embodiment of the invention.

Once an RTI or another suitable index has been created, such as has been described above or by other methods, the index can be searched by a variety of techniques. One algorithm for searching such an index is described below and depicted graphically in FIG. 6. The computer program used by the applicant to perform this applicant is referred under the trademark POWERDRILL. This algorithm assumes that an RTI of the structure and content described above has been provided, but variations using other types of indices are possible as well. This particular algorithm is considered a general search algorithm which can be used when searching based on user input for particular thematic roles, i.e. actors, actions, objects, and/or their specifiers. Steps performed in the algorithm are as follow. The reader should refer to FIG. 6 while reading these steps:
1. Read in the index of theta caseframe extractions into a searchable database.
2. Begin loop.
3. Accept from the user a term(s) for the slot of ACTOR, ACTION, OBJECT, or any of their SPECIFIERS.
4. Accept from the user an indication of whether they want the search to operate in intersection mode or union mode. Also accept an indication of whether or not to collapse results around a term's morphological roots.
5. Run query.
   a. If a term exists in the ACTOR slot, search the database of extracted NPs for any extracted NPs that match the ACTOR. Record the locations of these extractions in the query extraction location pool (QELP) as ACTOR results.
   b. If a term exists in the ACTION slot, search the database of extracted NPs for any that were extracted by theta caseframes which match the specified ACTION. Record the locations of these extractions in the query extraction location pool (QELP) as ACTION results.
   c. If a term exists in the OBJECT slot, search the database of extracted NPs for any extracted NPs that match the OBJECT. Record the locations of these extractions in the query extraction location pool (QELP) as OBJECT results.
   d. If a term exists in any of the SPECIFIER slots, search the database of extracted NPs for any specifier records extracted NPs that match user input. Record the locations of these extractions in the query extraction location pool (QELP) as SPECIFIER results. More than one specifier may be entered, e.g. an adjective modifier for the actor, and a prepositional phrase modifier for the action.
6. Display search results.
   a. If the system is in intersection mode, find the intersection of the ACTOR, ACTION, OBJECT, and SPECIFIER results in the QELP. (Two locations are in the same set if they document name and sentence number match.).
   b. If the system is in union mode, combine the ACTOR, ACTION, OBJECT, and SPECIFIER results in the QELP.
   c. Scan the locations in the QELP for unique text names, and display a list of these names to the user.
   d. Allow the user to select from the text names.
      i. Since each text may contain more than one extraction location, loop through the locations in the QELP that match the specified text name.
      ii. Begin loop.
      iii. Get the next extraction location in the selected text.
      iv. Display the sentence.
      v. End loop.
7. Display alternative ACTOR/ACTION/OBJECT and SPECIFIER terms.
   a. Scan the locations in the QELP.
      i. From each location, retrieve the verb-based theta caseframe (verb-based theta caseframes include "agent <verb>," "patient <verb>" and "agent <verb>patient") that applied to the extraction location and display the verb in the ACTION list. Check these verbs for membership in any predefined meta-types, and combine any appropriate terms into meta-type groupings.
      ii. From each location, retrieve any TH_AGENT-based theta caseframe ("agent <verb>") that applied to the extraction location and display the extracted NPs from those theta caseframes in the ACTOR list. Check these NPs for membership in any predefined meta-types, and combine any appropriate terms into meta-type groupings.
      iii. From each location, retrieve any TH_PATIENT-based theta caseframe ("patient <verb>") that applied to the extraction location and display the extracted NPs from those theta caseframes in the OBJECT list. Check these NPs for membership in any predefined meta-types, and combine any appropriate terms into meta-type groupings.
      iv. From each location, retrieve any verb-pp-based theta caseframe ("<verb.>pp" which captures constructions like "killed with a gun" or "said with conviction.") that applied to the extraction location and display the extracted NPs and prepositions from those theta caseframes in the ACTION specifier list. Check the NPs (not the prepositions) for membership in any predefined meta-types, and combine any appropriate terms into meta-type groupings.
      v. From each location, retrieve any noun-pp-based theta caseframes ("<noun>pp" which captures constructions like "priests of the church" or "trial by fire") that 1) applied to the extraction location, and 2) extracted the term(s) in the ACTOR slot, and display the extracted NPs and prepositions from those theta caseframes in the ACTOR specifier list. Check the NPs (not the prepositions) for membership in any predefined meta-types, and combine any appropriate terms into meta-type groupings.
      vi. From each location, retrieve any noun-pp-based theta casefames that 1) applied to the extraction location, and 2) extracted the term(s) in the OBJECT slot, and display the extracted NPs and prepositions from those theta caseframes in the OBJECT specifier list. Check the NPs (not the prepositions) for membership in any predefined meta-types, and combine any appropriate terms into meta-type groupings.
8. End of loop.

The basic steps listed above can also be augmented to cover the instance when a user wants to expand an actor or object result from its morphological root form. Steps to perform this additional function are as follow.

For each term selected by the user:
1. Capture the role the term is playing, i.e. actor or object.
2. Query the Relational Text Index for any extractions in which the term occurred in the captured theta role.
3. For each of these extractions:
   a. Retrieve the location of the noun phrase that generated the extracted term, i.e. the document, the sentence, and the location within that sentence.
   b. Retrieve from the document the phrase and display it.

Overall Search Processing Flow.

Figure 7:
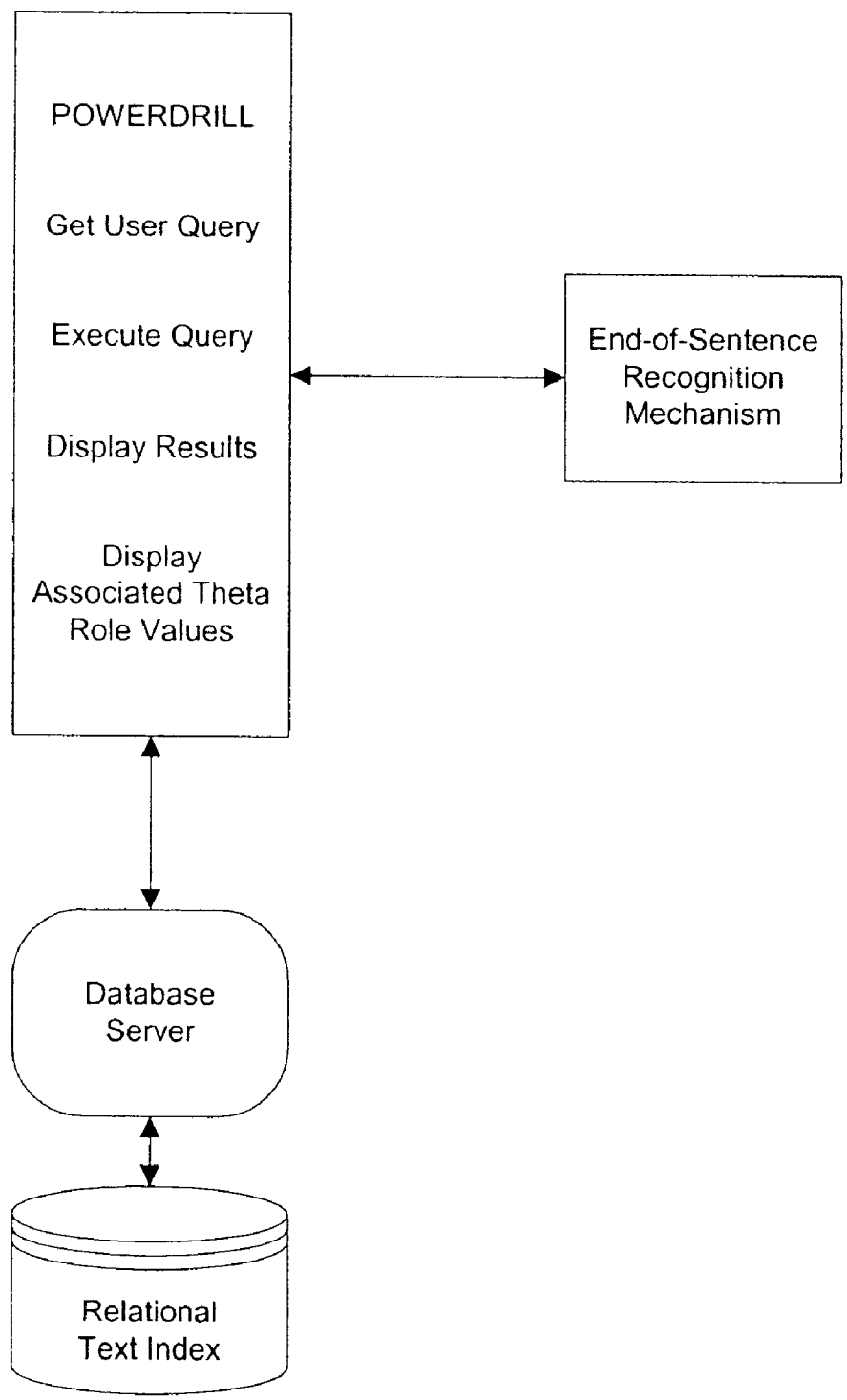
FIG. 7 depicts overall flow of search processing in one embodiment of the invention.

Referring to FIG. 7, overall processing flow for performing a search on the RTI in one embodiment of the invention is depicted. The general flow includes running a search program such as POWERDRILL to get a user query, execute the user query, display search results, and display associated theta role values. Communication with the RTI is achieved through a database server.

Although the inventors perform their searches using an RTI, other search indices could be created for us with the various embodiments of the search inventions. This particular embodiment of the invention depends on an RTI, a mechanism for locating a particular sentence within a document, and a database for serving the RTI.

An end-of-sentence mechanism is used that will normally take one of two forms. In the first case, a separate program that can perform end-of-sentence recognition is called with the document name and sentence number to locate. In the second case, a simple index of the starting and ending byte-values of each sentence in a document is consulted.
Search Examples.

The following material provides the user with examples of searching an RTI in one embodiment of the inventions. These examples assume that the POWERDRILL search program implemented by the inventors is being used to perform the search, although the inventions could be implemented using other software.

Figure 8:
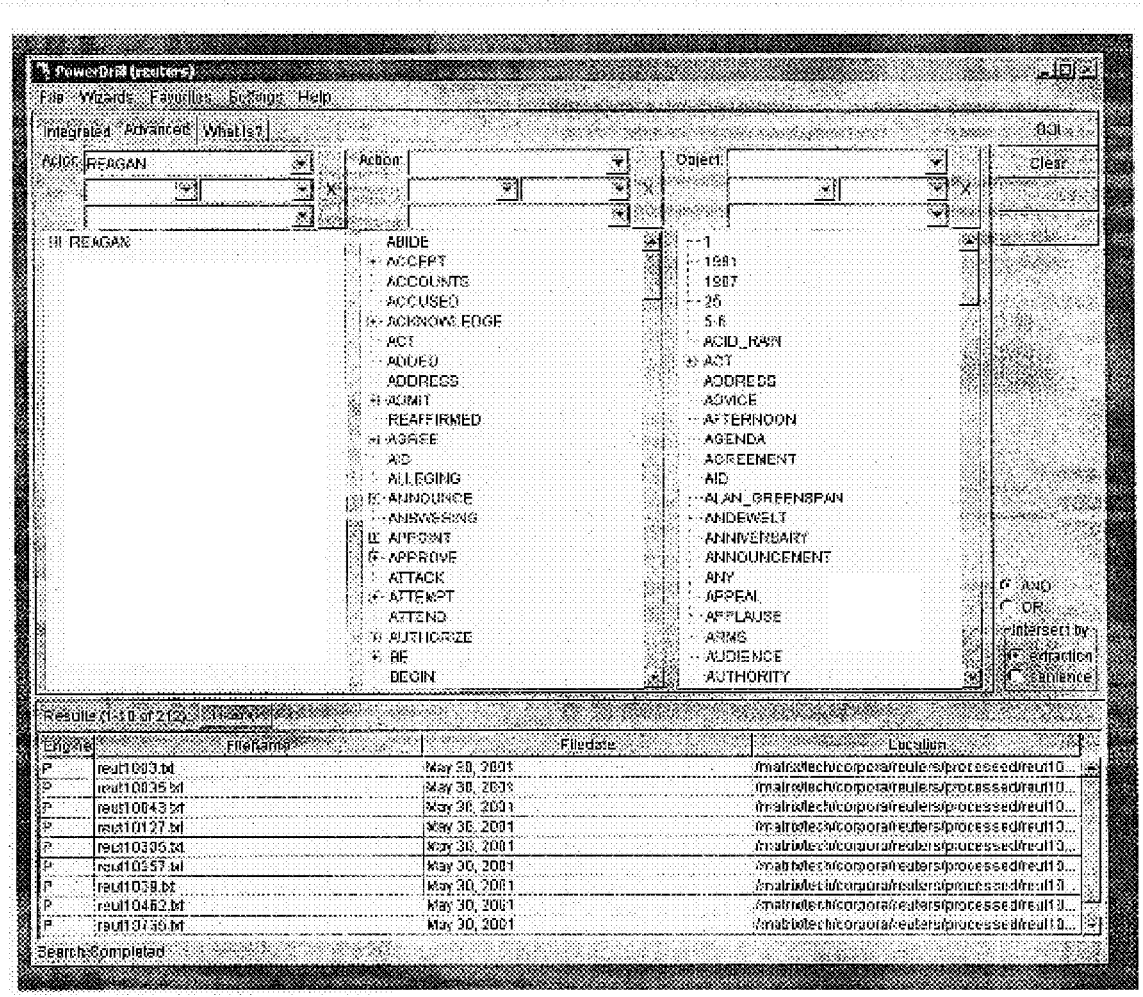

Referring to FIG. 8, a POWERDRILL screen shot is provided from a POWERDRILL installation over a set of Reuters newswire articles produced during the Reagan era. In this example, the user has told the search tool to search for events in which "Reagan" was the Actor, i.e. in which Reagan did something. In addition to retrieving a list of matching documents, the search tool displays a list of actions performed by Reagan, and a list of recipients of some of those actions. The user can now select one more of these actions or objects to refine the search.

Figure 9:
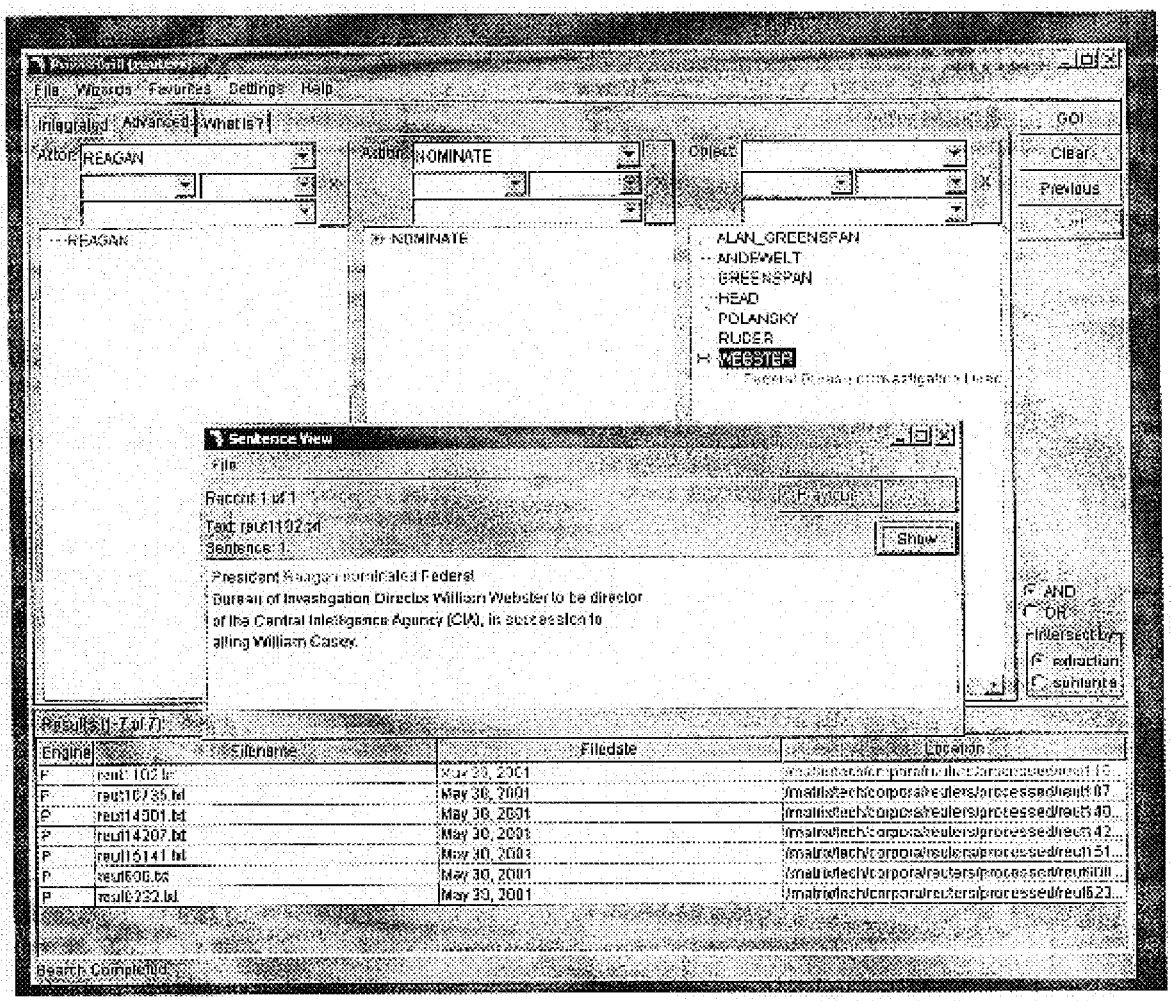

Referring to FIG. 9, there is a screen shot depicting that the user has selected "nominate" as the Action, and the search tool responds with documents in which Reagan nominated someone, and the Object column shows the nominees. The user can expand each extracted term to show its complete context—in this case, "Webster" expands to "Federal Bureau of Investigation Director William Webster." Note also, that by doubleclicking on one of the results, the search tool retrieves the sentence in which the event occurred, not the document itself.

The user can also view the entire document, with the sentence highlighted, if desired. However sentence-level of granularity of results can be tremendously valuable to reducing search time, particularly with large documents.

Figure 10:
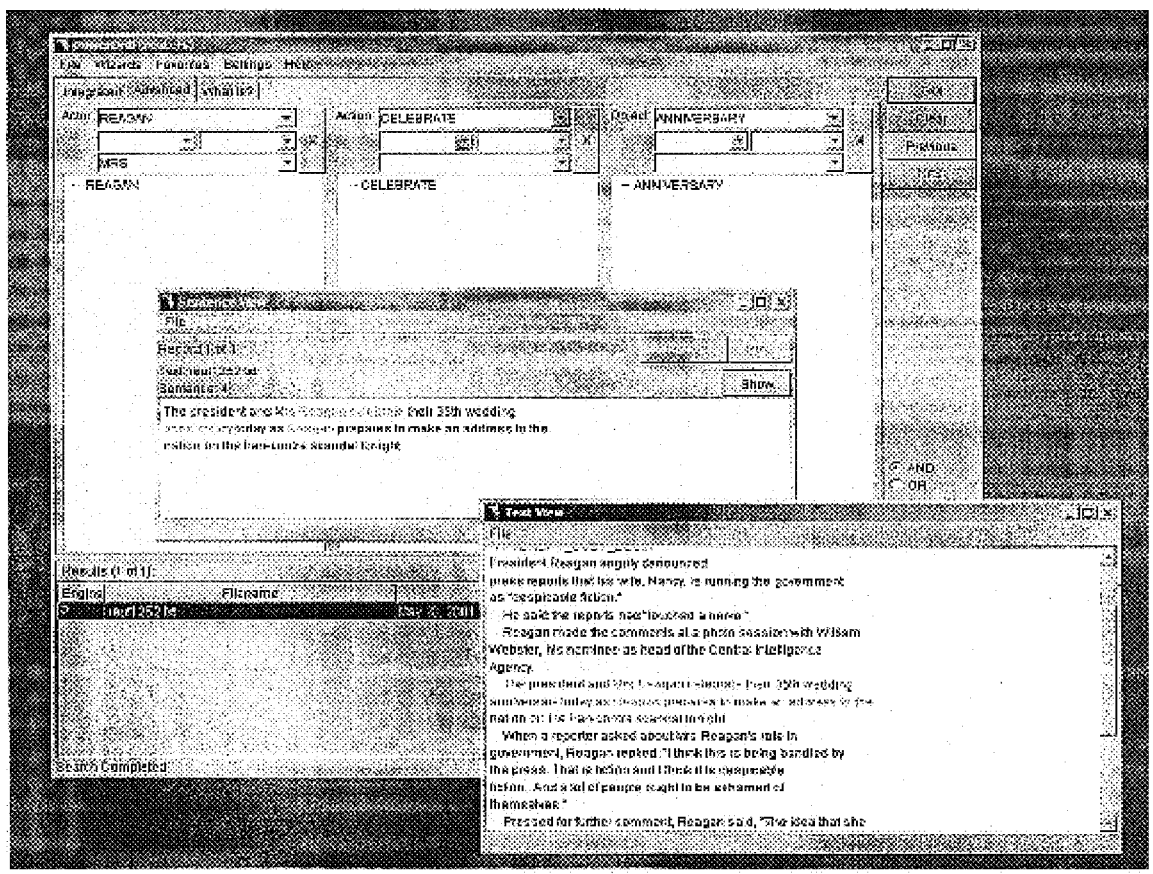

Referring to FIG. 10, the user has selected "Reagan" as the Actor and "Mrs." as a Specifier. The search tool now only displays events in which "Mrs. Reagan" performed some action. In this case, the user continued to drill down into the case of "Mrs. Reagan" celebrating an anniversary.

Figure 11:
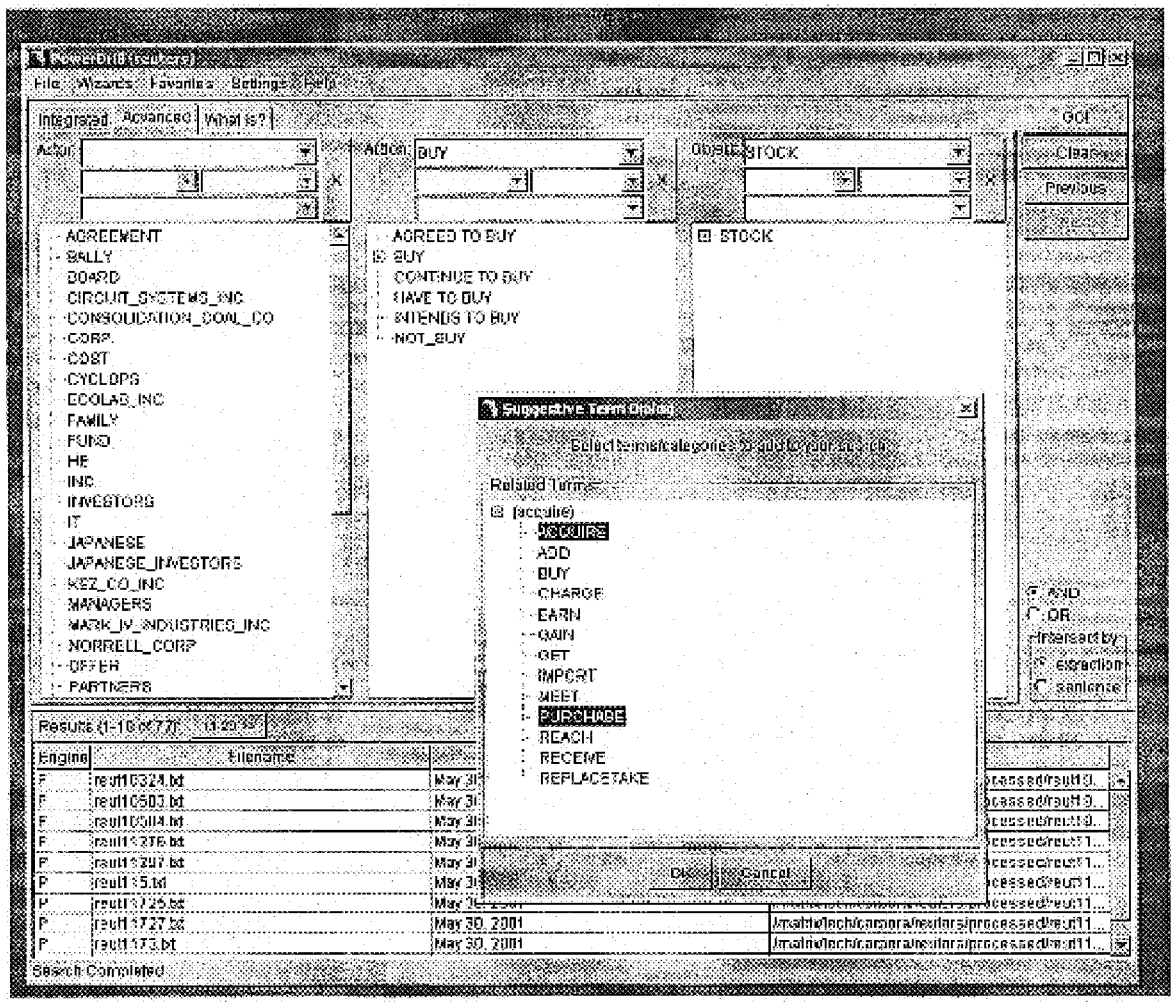

One of the problems associated with search tools is that it is often difficult for a user to pose a question in such a way that the system returns expected results. The invented search tools help address this problem in two ways. First, a user of the inventions user can consult a list of semantically related terms in crafted the query. In the screen shot of FIG. 11, the search tool is suggesting terms related to "buy" for the Action slot.

Figure 12:
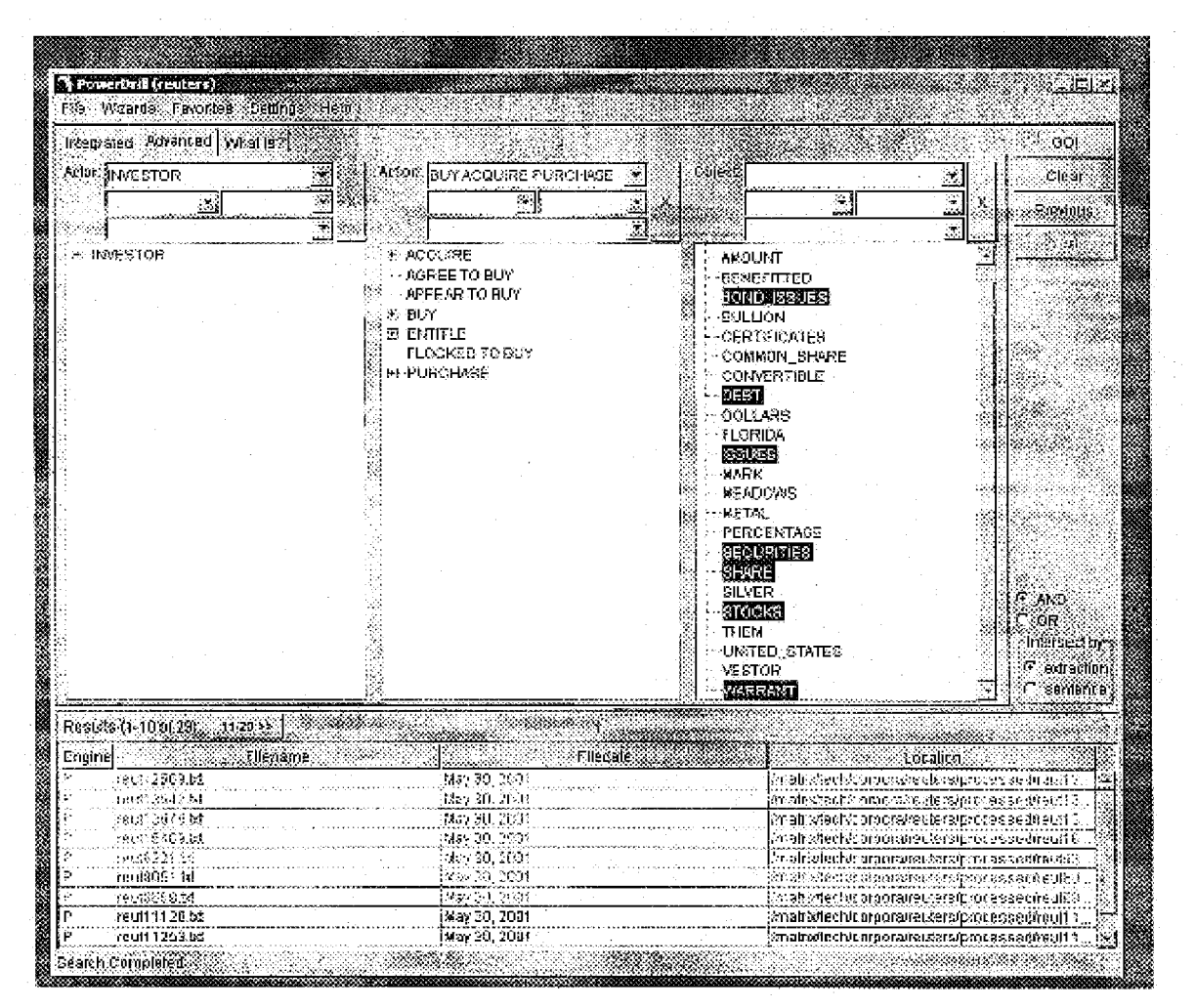

Second, the invention's exhaustive indexing of the document set provides a unique ability to explore the contents of the documents, and this exploration process can lead to expanded search terms. In the example of FIG. 12, the user wanted to find other terms related to "stock." By anchoring on "investors" as the Actor, and "buy," "acquire" and "purchase" as the Actions, the search tool shows everything that investors bought, acquired or purchased. The result now becomes a pick-list of suggested terms, and while the user may not have thought about entering "warrants" or "shares," he/she will benefit from a I'll-know-it-when-I-see-it process. This ability to peruse the content of the document set in an interactive way is a unique and powerful element of the inventions.

Figure 13:
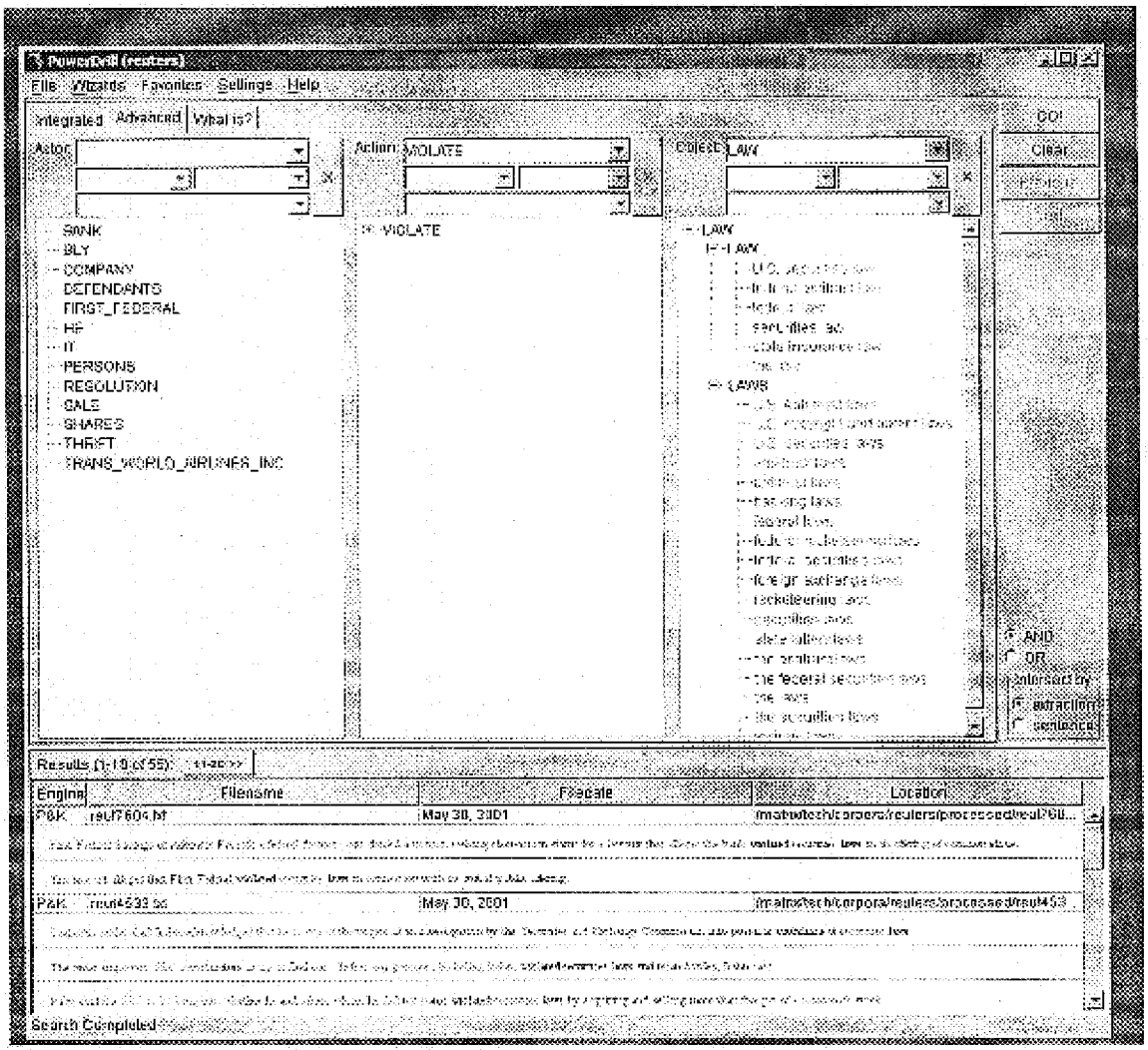

Finally, in the example of FIG. 13, the user has expanded the object term "law" and "laws" to see the full noun phrase extraction.
Data Mining and Analytics.

Analytics, often referred to as business intelligence, is the process of driving business functions from quantitative data.

For example, by recognizing that a company sells fifteen times as many tubes of toothpaste in the 6 ounce size as the 8 ounce size, the company may elect to discontinue producing the larger size to save production and marketing cost on a product that brings in little value. Traditionally, such processing could only be performed over numerical data, i.e., data that could be counted, averaged or otherwise statistically manipulated.

Using a relational text index, however, we now have the ability to mine events and attributes from textual data and feed them directly into an analytics processing system because these events and attributes can be statistically manipulated. The RTI has changed the free-form of English language text into a set of specific representations of meaning. For example, a customer may call into the consumer hotline complaining that the 8 ounce size tube of toothpaste is too large to fit in a medicine cabinet. The RTI records this event as a customer complaint with the attributes "8 ounces" and "toothpaste". If a marked number of similar calls are recorded by the hotline, analysis of the RTI will show that a large number of complaints are being received about 8 ounce sizes of toothpaste, alerting the company to the problems.

The main issue here is codifying information from unstructured text. The RTI represents meaning in a precise way, leading to the ability to recognize content of the text. Analytic processing over the RTI then is another way of using that content.

Use of the RTI in analytics permits the user to locate specific events or attributes with the text collection. For example, in a customer service database, the RTI will support the question, "What are my customers complaining about?" In contrast, in a data mining approach, the RTI supports this question: "What are my customers saying?" The distinction is on the analytics side I am asking about a specific defined event. On the data mining side, I am using the RTI to find events of statistical importance.
Computing Environment.

The inventors contemplate that the inventions disclosed herein may best be implemented using various general purpose or special purpose computer systems available from many vendors. One example of such as a computer system would include an input device such as a keyboard, mouse or screen for receiving input from a user, a display device such as a screen for displaying information to a user, computer readable storage media (including hard drives, floppy disks, CD-ROM, tapes, and other storage media) for storing both text data and software and software tools used in the invention, dynamic memory into which program instructions and data may be loaded for processing, and one or more processing for performing operations described above. The computer system may be a stand-alone personal computer, a workstation, networked computers, distributed processing across numerous computing systems, or another arrangement as desired. The documents to be processed using the inventions could be located on the computer system performing the processing or at a remote location. The RTI, once created, could be stored with the documents for later use, or it could be stored in another location, depending on the desires of those implementing the system.

While the present inventions have been described and illustrated in conjunction with a number of specific embodiments, those skilled in the art will appreciate that variations and modifications may be made without departing from the principles of the inventions as herein illustrated, as described and claimed. Any of the software components and steps described herein may be performed by custom-built software, and several of them may be performed by currently available off the shelf software that will be known to persons in the natural language processing field. The present inventions may be embodied in other specific forms without departing from their spirit or essential characteristics. The described embodiments are considered in all respects to be illustrative and not restrictive. The scope of the inventions are, therefore, indicated by the appended claims, rather than by the foregoing description. All changes which come within the meaning and range of equivalence of the claims are to be embraced within their scope.

What is claimed is:

1. A system for performing a search using a relational text index, the system comprising:
   a computer system having an input device, an output device, storage media, dynamic memory and a processor,
   documents located on said storage media,
   a parser capable of parsing natural language sentences contained within said documents to identify grammatical parts of the natural language sentences,
   a tool for applying caseframes to said parsed sentences to generate caseframe extractions, caseframes being syntactic structures that recognize local area context,
   a tool for performing thematic role assignment on said caseframe extractions to generate thematic role extractions,
   a tool for utilizing sentence information to build a relational text index that is usable by said computer system, said relational text index being located on said storage media and a search tool performing a search of said documents using said relational text index;
   wherein said search tool can search using at least one thematic role as a search determiner; and
   wherein said search tool can search using a thematic role specifier as a search determiner.

2. A system as recited in claim 1 wherein said search tool can search using meta types for thematic roles.

3. A system as recited in claim 1 wherein said search tool can search in union and intersection mode.

4. A system as recited in claim 1 wherein said search tool can search both based on a thematic role and on its root form.

5. A system as recited in claim 1 wherein said system has a facility to permit a user to input a search query, said search query including a thematic role selected from the group consisting of actor, action, object and specifier.

6. A system as recited in claim 1 wherein said search tool can compare an actor to noun phrases in said relational text index.

7. A system as recited in claim 1 wherein said search tool can compare an action to verb phrases in said relational text index.

8. A system as recited in claim 1 wherein said search tool cal compare said specifier to noun phrase specifiers in said relational text index.

9. A system as recited in claim 1 further comprising a facility for accepting a search query from a user, said search query including terms in a mode selected from the group consisting of union mode and intersection mode.

10. A system for performing a search using a relational text index, the system comprising:
    a computer system having an input device, an output device, storage media, dynamic memory and a processor,
    documents located on said storage media,
    a parser capable of parsing natural language sentences contained within said documents to identify grammatical parts of the natural language sentences,
    a tool for applying caseframes to said parsed sentences to generate caseframe extractions, caseframes being syntactic structures that recognize local area context,
    a tool for performing thematic role assignment on said caseframe extractions to generate thematic role extractions,
    a tool for utilizing sentence information to build a relational text index that is usable by said computer system, said relational text index being located on said storage media and a search tool performing a search of said documents using said relational text index;
    a tool for accepting a search query from a user, said search query including actor and action roles,
    a tool for querying said relational text index for instances when said actor or action is recorded in its appropriate role, for each query match, said tool being capable of retrieving the noun phrase of the extracted term, and for each query match, said tool being capable of retrieving the document and phrase where the match occurred, and
    a facility for displaying search results to the user.

11. A system as recited in claim 1 further comprising a database management system on which said relational text index is located.

12. A system as recited in claim 1 further comprising:
    a facility for accepting a search query from a user, and
    a tool for collapsing on the root form of search terms.

13. A system as recited in claim 1, wherein said search tool is capable of comparing verb roles to pre-defined meta types.

14. A system for creating a relational text index search system, the system comprising:
    a computer system that includes an input device, an output device, storage media and a processor,
    a corpa of natural language text documents located on said storage media,
    a parser capable of parsing natural language sentences in said documents to generate diagrammed sentences, said parser being capable of producing an output selected from the group consisting of noun phrases, verb phrases, prepositional phrases, adverbial phrases, adjectival phrases, clauses, and combinations of them,
    a tool for applying caseframes to said diagrammed sentences to generate caseframe extractions,
    a tool for performing thematic role assignment on said caseframe extractions to generate thematic role extractions, said thematic role assignment tool being capable of translating raw caseframe-extractions to specific thematic roles,
    relational text index file containing thematic role, and
    a search tool for searching of said corpa of documents using said relational text index;
    a facility for accepting a search query from a user and permitting a user to specify at least one search role selected from the group consisting of actor, action, object and specifier; and
    a tool for comparing a user's search roles to thematic roles in said relational text index.

15. A system as recited in claim 14 further comprising a tool for collapsing on morphological root form of search roles.

16. A system as recited in claim 14 further comprising a facility for displaying portions of documents where user search roles were found.

* * * * *